June 30, 1931.　　　S. WHITWORTH　　　1,812,028
BRAKE SHOE
Filed July 19, 1929
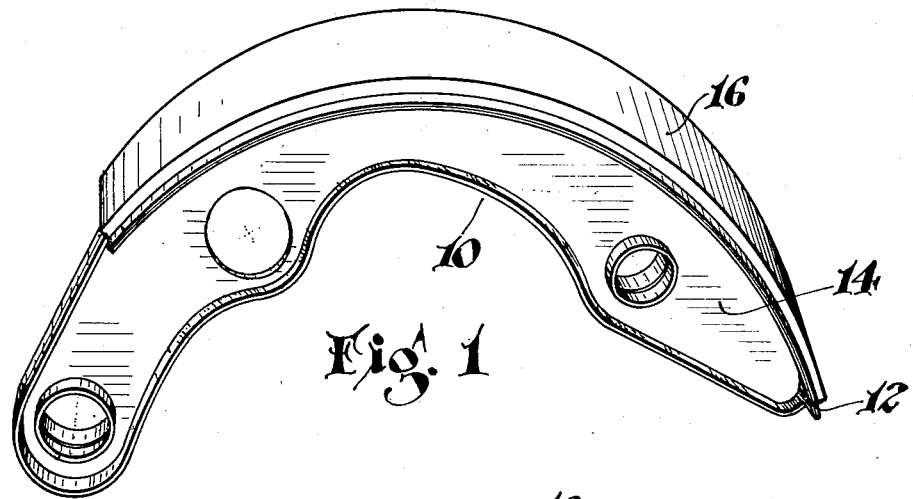
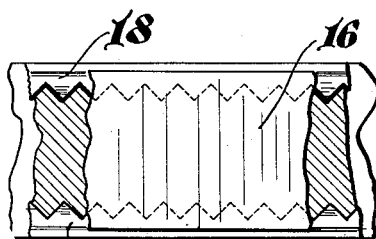
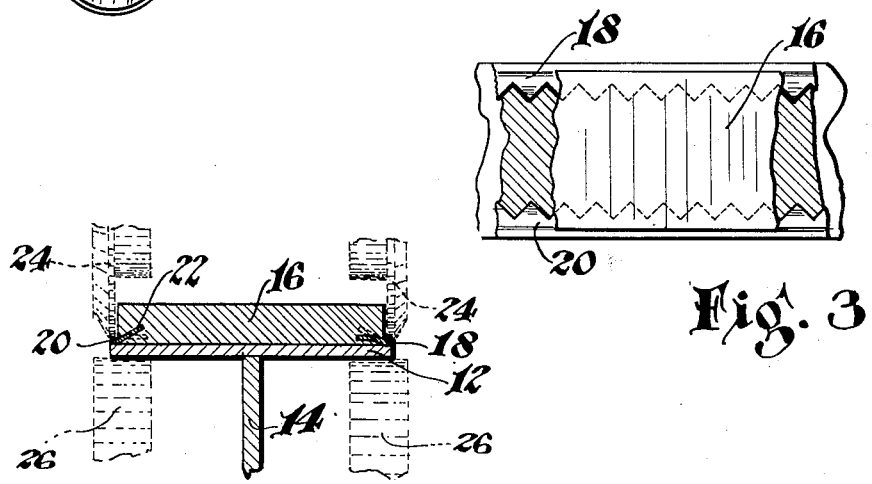
INVENTOR.
Stanley Whitworth
BY H. O. Clayton
ATTORNEY Patented June 30, 1931

1,812,028

UNITED STATES PATENT OFFICE

STANLEY WHITWORTH, OF SOUTH BEND, INDIANA, ASSIGNOR TO BENDIX BRAKE COMPANY, OF SOUTH BEND, INDIANA, A CORPORATION OF ILLINOIS

BRAKE SHOE

Application filed July 19, 1929. Serial No. 379,352.

This invention relates to brake shoes or equivalent brake elements and is illustrated as embodied in a rigid arcuate shoe for an internal expanding automobile brake.

An object of the invention is to simplify the manufacture of the shoes by eliminating the riveting of the lining, preferably by providing metallic inserts in the lining which are welded to the shoe proper. In my preferred embodiment of the invention, a pair of metallic inserts are arranged one along each side of the lining, the same being securely embedded within the same and portions of said inserts projecting from the edge of the lining, are welded directly to the body of the shoe by any of the well known methods of line or seam welding.

The above and other objects and features of the invention, including various novel and desirable details of construction will be apparent from the following description of one illustrative embodiment shown in the accompanying drawings, in which:

Figure 1 is a side elevation of a brake shoe embodying my novel friction lining;

Figure 2 is a transverse section through the brake shoe and also shows a form of apparatus for securing the friction lining to the body of the shoe; and Figure 3 is a partial plan of the shoe of Figure 1, parts being broken away to show the novel securing means for the friction lining.

As disclosed in Figure 1, the shoe proper 10 or equivalent brake element may be of any desired construction, the one illustrated being built up of a curved outer steel stamping or rim 12 and a steel stamping or stiffening web 14 welded or otherwise centrally secured to the rim of the shoe.

The lining 16, which may be of any of the usual asbestos body friction compositions, either woven or molded, is provided along its opposite sides and adjacent its lower face with iron or steel inserts 18 and 20 embedded therein the same being preferably formed with V-shaped securing tongues or tabs 22, alternate tabs being bent upwardly as disclosed in Figure 2 to securely key the insert to the lining. The outer edges of the inserts 18 and 20 project from the side face of the friction lining 16 to a small extent, as indicated in Figure 2, to provide sufficient material to be contacted by the rollers 24 constituting the upper electrodes of a line or seam welding apparatus, the lower electrodes 26 acting as supports and contacting the under side of the rim 12 of the shoe. The securing of the lining to the shoe body is effected by the line welding of the inserts directly to the outer face of the rim of the shoe, thus obviating the conventional method of securing the lining to the shoe body by means of rivets.

My invention has the added feature of obviating the curling of the friction material at the edge of the shoe, which often occurs when the same is secured at the center of the shoe as by rivets. A very rigid connection is effected by the process described and with the securing of the lining at the edges of the same there are no projections throughout the body of the same thereby giving a greater area of contact of the friction material with the element to be braked.

While one illustrative embodiment has been described in detail, it is not my intention to limit the invention to that particular embodiment or otherwise than by the terms of the appended claims.

I claim:

1. A metallic brake element having a friction lining, said lining having adjacent each side edge thereof a metallic insert permanently secured to said element, each insert characterized by a strip of metal having alternately projecting securing tabs embedded within the body of the lining.

2. A metallic brake element comprising a friction lining, said lining having adjacent each side edge thereof a metallic strip embedded therein, said strip characterized by securing tabs embedded in said lining.

3. A metallic brake element having a friction lining, said lining having adjacent each side edge thereof, a metallic strip embedded therein, said strip characterized by V-shaped securing tabs alternate tabs projecting upwardly into the body of the lining.

4. A metallic brake element having friction lining, said lining including adjacent each side edge thereof a metallic insert characterized by V-shaped securing tabs projecting within the body of the lining, said insert projecting at its outer edge beyond the side wall of the lining.

5. That method of manufacturing a brake shoe which comprises partially embedding, within an arcuate friction band, metallic inserts, and attaching a correspondingly shaped supporting rim to those portions of the metallic inserts which project from the body of the lining.

6. That method of manufacturing a brake shoe which comprises forming an arcuate band of friction lining, inserting a metallic securing element along each edge of said band, keying said metallic securing elements to said lining by metallic tabs on said elements and subsequently welding a metallic supporting rim to said elements at their side edges.

In testimony whereof, I have hereunto signed my name.

STANLEY WHITWORTH.